Patented May 22, 1928.

1,670,990

UNITED STATES PATENT OFFICE.

HANS RUPE, OF BASEL, SWITZERLAND, ASSIGNOR TO SOCIETY OF CHEMICAL INDUSTRY IN BASLE, OF BASEL, SWITZERLAND.

HYDROCYCLIC-ω-AMINOALKYL COMPOUND AND PROCESS OF MAKING SAME.

No Drawing. Application filed September 2, 1925, Serial No. 54,135, and in Switzerland October 1, 1924.

This invention relates to the manufacture of hydrocyclic-ω-aminoalkyl compounds by catalytically reducing hydrocyclic cyano-compounds. It comprises the process of making these compounds as well as the products obtained by this process.

The process is particularly suitable for making α-aminomethyl derivatives of hydro-aromatic ketones containing the group

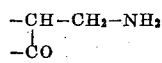

starting from the α-cyano derivatives of the latter containing the group

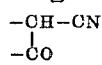

Thus, for example, from α-cyanocamphor of the formula:

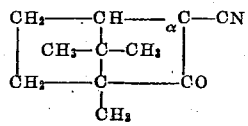

there is obtained in good yield, by catalytic reduction in presence of finely subdivided nickel, the hitherto unknown camphomethylamine of the formula:

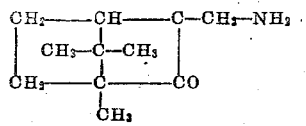

As intermediate product there is formed a secondary base of the formula

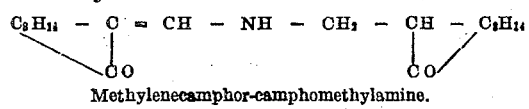

Methylenecamphor-camphomethylamine.

This is split up by boiling with dilute acid into camphomethylamine and hydroxymethylenecamphor:

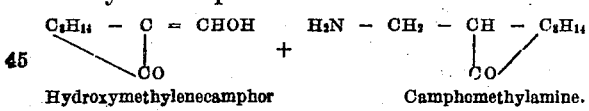

Hydroxymethylenecamphor    Camphomethylamine.

In like manner other hydrocyclic cyano-compounds, such as the cyano derivatives of menthone, thujone, pulegone, cyclohexanone, may be converted into the corresponding aminoalkyl compounds.

The new compounds are distinguished from their parent materials by their basic character. They can be converted by acids into salts soluble in water and are useful for therapeutic purposes.

The nickel catalyst used for the hydration may preferably be made by the following method (cf. also Helv. Chim. Acta. Vol. I, p. 455):—

Pieces of clay plates are ground in a ball mill provided with steel balls to a fine powder. 100 grams of this powder are triturated with a solution of nickel sulfate in 400 grams of water to a thin paste. While agitating strongly soda solution is then added until the reaction is alkaline or, better still, the calculated amount of caustic soda solution is allowed to flow in. The whole is then boiled up with 2–3 liters of water, poured into a great quantity of cold water, decanted carefully from the residue, whereupon the latter is filtered by suction, or, better still, centrifuged. This process must be repeated until the mass no longer shows any alkaline reaction. Finally the material is dried at 140° and powdered to a very fine mass. This powder is reduced by passing hydrogen over it at about 300°. There is thus obtained a black to black-brown powder containing about 33 per cent. of Ni, which, when exposed to the air, ignites and glows.

The following examples illustrate the invention.

*Example 1.*

56 grams of α-cyanocamphor (made as described by Lapworth, Journal of the Chemical Society (1900) vol. 77, page 1058) are dissolved in a mixture of 900 c. c. of alcohol, 900 c. c. of ethylacetate and 300 c. c. of water, and the solution is shaken with 120 grams of nickel catalyst made as described above. After the mass has absorbed the calculated quantity of hydrogen ($3H_2$ per 2 mols. cyanocamphor) the nickel catalyst is filtered, the mixture of alcohol and ethylacetate is distilled in steam and the oil remaining in the residue is extracted with ether and hydrogen chloride is passed into the etheral solution. In this manner the colorless hydrochloride of methylene camphor-camphomethylamine separates in pulverulent form. This salt is very easily soluble in alcohol but insoluble in other solvents. The free base which is obtainable from the hydrochloride by neutralization with sodium carbonate forms, when re-crystallized from benezene or ether, colorless prisms, having the form of bundles and melting at 152° C. They dissolve easily in most organic solvents and are somewhat more sparingly soluble in ether, benzene and mixtures of benzene with benzine.

45 grams of the hydrochloride are stirred with 150 c. c. of concentrated hydrochloric acid and introduced into 500 c. c. of hot water, which is then boiled for half-an-hour.

For the purpose of separating the hydroxymethylenecamphor which has been split off, the hydrochloric acid solution is shaken with ether, whereupon the hydroxymethylenecamphor passes into the ethereal layer. After separation of the latter the aqueous solution is evaporated whereby the hydrochloride of α-camphomethylamine is obtained in good yield. This salt is purified by precipitation from the aqueous solution by caustic soda solution, dissolution of the separated free base in ether and introduction of hydrogen chloride into the ethereal solution. The hydrochloride of camphomethylamine forms colorless needles which decompose at temperatures above 243° C. and are very freely soluble in water and alcohol. The free base obtained from the hydrochloride by action of caustic soda solution is a strongly basic liquid smelling of camphor, and freely soluble in all organic solvents but sparingly soluble in water; it distills under 11 mm. pressure at 126–128° C.

*Example 2.*

25 grams of cyanomenthone (yellow oil, boiling under 11 mm. pressure at 162–164° C.) are dissolved in a mixture of 500 c. c. of alcohol and 250 c. c. of water and shaken with 120 grams of nickel catalyst (made as described in Helv. Chim. Acta. Vol. I, page 453 and following). After the mass has absorbed the calculated quantity of hydrogen (3 molecules of $H_2$ per 2 molecules of cyanomenthone), the nickel catalyst is filtered and the filtrate distilled in steam.

The oil remaining in the residue is heated with dilute hydrochloric acid. In this manner splitting occurs into hydroxymethylenementhone and menthomethylamine hydrochloride.

For the purpose of separating the hydroxymethylenementhone which has been split off, the hydrochloric acid solution is shaken with ether, whereby the hydroxymethylenementhone passes into the ethereal layer. After separation of the latter the dilute acid solution is evaporated, whereby the hydrochloride of α-menthomethylamine is obtained in good yield. This latter is converted into the free base by crystallization in dilute hydrochloric acid, dissolution of the salt obtained in water and precipitation of the aqueous solution with caustic soda solution.

The α-menthomethylamine thus obtained is a strong base. It may be converted into salts soluble in water. The free base is an oil, freely soluble in the usual organic solvents, scarcely soluble in water, and distilling at 126–128° C. under 10 mm. pressure. The hydrochloride forms colorless crystals which melt at 205° C. and are very easily soluble in water.

The cyanomenthone employed in this example as parent material is obtained as follows: 204 grams of freshly distilled menthone are added to 80 grams of finely pulverized sodium amide in 725 c. c. of pure benzene, whereby an increase of the temperature and evolution of ammonia occur. The reaction being achieved, the whole is further heated for some hours in a water bath, while stirring. After cooling 156 grams of isoamylformate are added little by little while cooling well. The reaction mass, which solidifies after some time, is dissolved in 900 grams of ice water, the aqueous solution is separated from the mixture of amyl alcohol and benzene, extracted with ether in order to liberate it completely from the amyl alcohol, benzene and menthone, and finally acidified while cooling. The hydroxymethylenementhone separates as a red oil which is extracted with ether and dried with magnesium sulfate. The ether is then distilled off and the hydroxymethylenementhone distilled in a vacuum (boiling point 119–120° C. at 11 mm. pressure).

86 grams of hydroxymethylenementhone are dissolved in a small quantity of alcohol and treated at 7° C. with a saturated solution of 35 grams of hydroxylamine hydrochloride in order to convert it into the isoxazol derivative. The mixture is then left to stand for 5 or 6 hours until the enol reaction has disappeared. The greater part of the alcohol is then evaporated with caution under reduced pressure, the residue is treated with water, the oil that separates is extracted with ether, the dried ether is evaporated and the residue distilled in a vacuum. The isoxazol derivative boils at 136–137° C. under 11 mm. pressure.

80 grams of the ioxazol derivative are dissolved in 2500 c. c. of ether and added little by little, while stirring, to a solution of 25 grams of sodium in absolute ethyl alcohol. The mixture is allowed to stand for some hours and water is added in order to remove the turbidity occurring at the beginning.

The ethereal-layer is then separated from the aqueous layer, which latter is shaken with ether. The alkaline liquid is acidified and the cyanoketone extracted with ether, the ethereal solution dried with sodium sulfate, the ether evaporated and the residue distilled in a vacuum. The cyanomenthone boils at 162–164° C. under 11 mm. pressure.

In an analogous manner as described in Examples 1 and 2, cyclohexanonemethylamine may be obtained from cyanocyclohexanone. The former is a strong base of a characteristic smell which is freely soluble in all organic solvents, melting at 63–65° C. and boiling under 12 mm. pressure at about 150° C.

What I claim is:—

1. Process for the manufacture of hydrocyclic ω-amino compounds by catalytically reducing hydrocyclic cyanoketones.

2. Process for the manufacture of hydrocyclic ω-aminoalkyl compounds containing the group:

by catalytically reducing a hydrocyclic cyanoketone containing the group

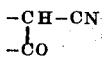

3. Process for the manufacture of hydrocyclic ω-amino compounds by catalytically reducing hydrocyclic cyanoketones and hydrolyzing the intermediate product so formed in an acid medium.

4. Process for the manufacture of camphomethylamine of the formula:

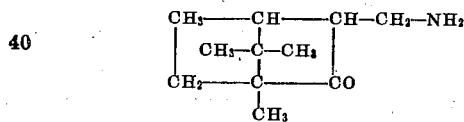

by catalytically reducing α-cyanocamphor of the formula:

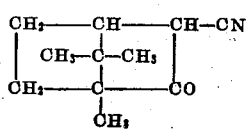

5. Process for the manufacture of camphomethylamine of the formula:

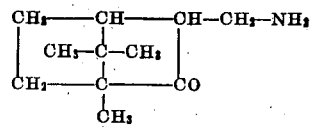

by catalytically reducing α-cyanocamphor of the formula:

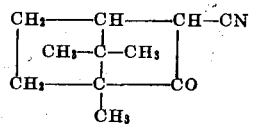

and hydrolyzing the intermediate product so formed in an acid medium.

6. In the manufacture of hydrocyclic ω-aminoalkyl compounds from the corresponding cyanocompounds the use of nickel as a hydrogenating catalyst.

7. As new products useful in therapeutics the hydrocyclic ω-aminoalkyl compounds containing the group

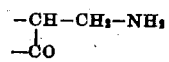

which are strongly basic liquids freely soluble in all organic solvents and forming with acids crystalline salts readily soluble in water.

8. As a new product useful in therapeutics the herein described camphomethylamine of the formula:

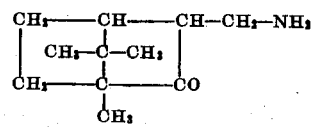

which is a strongly basic liquid smelling of camphor, distilling under 11 mm. pressure at 126–128° C., freely soluble in all organic solvents and forming with acids salts readily soluble in water, for instance a hydrochloride of the melting point 243° C.

In witness whereof I have hereunto signed my name this 21st day of August 1925.

HANS RUPE.